(12) United States Patent
Alig

(10) Patent No.: US 11,078,819 B2
(45) Date of Patent: Aug. 3, 2021

(54) METHOD FOR OPERATING A PARTICLE FILTER

(71) Applicant: Bayerische Motoren Werke Aktiengesellschaft, Munich (DE)

(72) Inventor: Robert Alig, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/870,562

(22) Filed: May 8, 2020

(65) Prior Publication Data

US 2020/0271029 A1 Aug. 27, 2020

Related U.S. Application Data

(63) Continuation of application No. PCT/EP2018/076092, filed on Sep. 26, 2018.

(30) Foreign Application Priority Data

Nov. 9, 2017 (DE) .................... 10 2017 219 940.7

(51) Int. Cl.
*F01N 3/021* (2006.01)
*F01N 3/023* (2006.01)

(52) U.S. Cl.
CPC ............ *F01N 3/021* (2013.01); *F01N 3/0232* (2013.01); *F01N 2510/00* (2013.01); *F01N 2610/12* (2013.01)

(58) Field of Classification Search
CPC ...... F01N 3/0232; F01N 3/029; F01N 3/0293; F01N 2430/04; F01N 2610/12; B01D 2239/0471; B01D 2239/0478; B01D 2273/12
See application file for complete search history.

(56) References Cited

U.S. PATENT DOCUMENTS

| 8,713,913 B2 | 5/2014 | Wenninger et al. |
| 2010/0154640 A1* | 6/2010 | Hagg ............... F01N 3/0211 95/286 |
| 2018/0298799 A1* | 10/2018 | Wessels ............ F01N 13/0097 |

FOREIGN PATENT DOCUMENTS

| DE | 10 2009 049 624 A1 | 4/2011 |
| DE | 10 2016 110 166 A1 | 12/2016 |
| DE | 10 2016 103 735 A1 | 9/2017 |
| EP | 3 388 645 A1 | 10/2018 |

OTHER PUBLICATIONS

PCT/EP2018/076092, International Search Report dated Mar. 29, 2019 (Two (2) pages).
German Search Report issued in German application No. 10 2017 219 940.7 dated Jun. 19, 2018, with Statement of Relevancy (Six (6) pages).

* cited by examiner

*Primary Examiner* — Jonathan R Matthias
(74) *Attorney, Agent, or Firm* — Crowell & Moring LLP

(57) ABSTRACT

A method for operating a particle filter of a vehicle includes creating an ash to be introduced into a filter body of the particle filter by arranging a carrier material of an ash former on an input side of an end face of the filter body, as viewed in a flow direction of an exhaust gas through the particle filter, and combusting the carrier material, where a non-combustible constituent of the ash former is arranged on the carrier material. The created ash is then introduced into the filter body of the particle filter.

7 Claims, 2 Drawing Sheets

METHOD FOR OPERATING A PARTICLE FILTER

CROSS REFERENCE TO RELATED APPLICATIONS

This application is a continuation of PCT International Application No. PCT/EP2018/076092, filed Sep. 26, 2018, which claims priority under 35 U.S.C. § 119 from German Patent Application No. 10 2017 219 940.7, filed Nov. 9, 2017, the entire disclosures of which are herein expressly incorporated by reference.

BACKGROUND AND SUMMARY OF THE INVENTION

The invention relates to a method for operating a particle filter of a vehicle in which ash is introduced into a filter body of the particle filter. At least one ash former is combusted for this purpose.

Exhaust gas systems for drawing off and cleaning exhaust gases from an internal combustion engine may exhibit a particle filter. A particle filter filters ash and soot particles, in particular, from the exhaust gas and these are then deposited in the filter material. In many particle filters for gasoline engines the effect described below may occur in this case. Large particles are filtered comparatively well, as they are highly likely to encounter filter material and adhere thereto on account of their size. In the case of very small particles, it can be observed with many particle filters that, starting with a brand-new particle filter in the initial phase of use of the particle filter, an increase in filtration efficiency can be observed. This is attributable to the fact that very small particles are more likely to adhere to particles already deposited in the filter material than to the clean filter material of a brand-new particle filter. Furthermore, particle filters are known from the prior art in which the filtration, in particular in a cell structure of the filter, is based on at least one or more of the effects referred to below: diffusion, interception, inertia separation, and screening.

A method is known from DE 10 2016 103 735 A1 for artificial ash creation in a particle filter. In this case, a layer of ash is selectively applied to a particle filter as a filter cake in the new state. A first method is described in which a special fuel is used as a first fill of the vehicle, a second method in which special ash-forming oil is fed to the vehicle. In a third method, direct coating of the channel surface of the particle filter with an ash former which is burned off in a downstream process is used.

A problem addressed by the present invention is that of providing an improved, or at least alternative, method for increasing filtration efficiency, particularly in an initial life cycle of a particle filter.

The problem addressed by the invention is that of improving a method of the aforementioned kind in such a manner that the ash is introduced into the filter body of the particle filter in a particularly simple manner.

In the method according to the invention for operating a particle filter of a vehicle, ash is introduced into a filter body of the particle filter. At least one ash former is combusted for this purpose. The ash to be introduced into the filter body of the particle filter is created by a carrier material of the ash former being arranged on an input side of the end face of the filter body and combusted. This end face is the end face on the input side, viewed in the flow direction of the exhaust gas through the particle filter. At least one non-combustible constituent of the ash former is arranged on the carrier material. Combustion of the carrier material therefore leads to the production of a combustion residue of the ash former, namely ash. This ash is then introduced into the filter body of the particle filter with the exhaust gas and increases the filtration efficiency of the particle filter. However, this takes place in a particularly simple way, since only the carrier material with the non-combustible constituent needs to be arranged on the input side of the end face of the filter body, after which the carrier material is combusted. In this way, the ash can be introduced into the particle filter at particularly low cost and with particularly little complexity.

In addition, when testing the vehicle during production thereof, an internal combustion engine of the vehicle fitted with the particle filter is put into operation, in order to bring about the combustion of the carrier material. This also makes the method particularly straightforward and cost-effective.

Furthermore, for example, metal-bearing waste can be applied to the end face as the ash former, which means that the ash former can be provided very cost-effectively. A residue or waste material, preferably from a foundry or preferably from waste water purification, or particularly preferably from rubbish incineration or the like, can be used to provide the non-combustible constituent of the ash former too.

By introducing the ash into the filter body of the particle filter, a high filtration efficiency of the particle filter can be achieved right at the start of the service life of the particle filter. Accordingly, particularly when the particle filter starts to operate, an internal combustion engine of the vehicle fitted with the particle filter does not need to be operated, or is operated to a more limited extent, in such a manner that the formation of soot particles is reduced as far as possible. This also simplifies the method. Furthermore, potential savings can be made in relation to components or devices which are necessary, particularly in order to reduce particle formation and to introduce ash into the filter body of the particle filter, and also in relation to staffing costs, particularly for development.

At least one paper and/or at least one plastic can be used as the carrier material. Paper provided with a metal layer, for example, can be supplied particularly easily and cost-effectively and arranged on the input side of the end face of the filter body. However, a sludge containing metals and/or metal oxides may also be arranged on the carrier material in the form of paper and/or plastic, in order to supply ash following combustion of the carrier material. Furthermore, a suspension comprising metals and/or metal oxides, in particular, or a sludge may contain organic material as the carrier material, and the suspension or the sludge may be applied to the end face of the filter body. More preferably, it is made possible for this suspension or this sludge, or else the substance provided to create ash for the particle filter, preferably at least the ash former, to be received in a preferably combustible container, preferably a bag, which more preferably has plastic as a constituent or is made of plastic, and for this to be arranged as previously shown in the exhaust gas system. During thermal action of the exhaust gas, in particular, this container releases the substance contained therein and ash is created for the particle filter.

A metal layer applied to the carrier material and/or a metal suspension applied to the carrier material is preferably used as the at least one non-combustible constituent. In this way, a quantity of ash which is to be introduced into the filter body of the particle filter can be particularly accurately specified.

The at least one ash former may be arranged in the form of at least one ball on the end face of the filter body. For example, balls of metal paper—in other words paper provided with a metal layer—can be arranged on the end face of the filter body and the carrier material is then combusted. In this way, ash is formed from the balls and introduced into the filter body with the exhaust gas. Paper balls of metal paper or paper balls provided with metal sludge or a metal suspension can very easily be arranged on the end face of the filter body. In addition, it can thereby be very easily ensured that the filter body can be flowed through by the exhaust gas in a largely unhindered manner, despite the application of the ash former to the input side of the end face.

As a further, additional possibility, it is provided that the ash former should be arranged upstream of the particle filter relative to the planned flow direction of the exhaust gas, advantageously in the inlet funnel or preferably in the outlet funnel of a catalytic converter or particularly preferably in the inlet and in the outlet funnel of the catalytic converter. A catalytic converter of this kind is arranged upstream of the particle filter in respect of the planned flow of the exhaust gas.

This can be achieved, additionally or alternatively, if, according to a further advantageous embodiment, the at least one ash former in the form of a plurality of individual parts is arranged on the end face of the filter body. For example, strips or snippets of the carrier material with the non-combustible constituent thereupon can be arranged on the end face of the filter body. It is therefore also ensured that the exhaust gas can easily flow into the filter body or can flow through the filter body.

Additionally or alternatively, it may be provided that a plurality of passages for the exhaust gas is formed in the at least one ash former. For example, the ash former arranged on the end face of the filter body can be perforated, in order to ensure good through-flowability of the filter body for the exhaust gas.

It has proved further advantageous for at least one adhesive agent to be applied to the at least one ash former, by means of which the at least one ash former is held on the end face of the filter body. Hence, it can be particularly effectively ensured that walls of the filter body are very uniformly exposed to the ash which is formed by burning off the carrier material.

It has proved further advantageous for a combustion product, which is formed in particular during the combustion of organic constituents of the ash former and/or of the carrier material, to contribute to increasing the filtration action of the particle filter.

During the manufacture of the vehicle fitted with the particle filter, an internal combustion engine of the vehicle is preferably operated in such a manner that suitable conditions for combustion of the carrier material are present in the region of the at least one ash former. For example, during an end-of-line test, such as is carried out during production of the vehicle, the internal combustion engine is suitably operated so that there is a sufficiently high temperature for combustion of the carrier material and there is sufficient oxygen present in the region of the at least one ash former. If the vehicle is then handed over to a user following the end-of-line test, the particle filter already has greater filtration efficiency due to the introduction of ash into the filter body. This leads to a particularly low particle emission during the actual running of the vehicle.

A temperature and/or a mass flow of the exhaust gas flowing through the particle filter of an internal combustion engine of the vehicle fitted with the particle filter are set in such a manner that the ash is deposited at least predominantly on at least one wall of the filter body. This is because the improved filtration efficiency of the filter body brought about by the ash can thereby be used beyond the length of the wall. For example, a low mass flow of exhaust gas through the particle filter ensures that the exhaust gas is substantially deposited on the wall of the filter body and, to a lesser extent, on a closed end of a channel limited by the wall which is formed in the particle filter.

Finally, it has proved advantageous for the particle filter for filtering particles from the exhaust gas of an internal combustion engine operated as a gasoline engine of the vehicle fitted with the particle filter to be used. This is because in the case of a gasoline engine which releases a lower mass of soot particles during operation compared with a diesel engine, the targeted increase in filtration efficiency through the introduction of ash into the filter body ensures that low particle emissions are reached during operation of the vehicle even over the first kilometers.

Further features of the invention result from the claims, the Figures and the description of the Figures. The features and combinations of features referred to in the description above and also the features and combinations of features referred to below in the description of the Figures and/or in the Figures themselves can not only be used in the combination specified in each case, but also in other combinations or in isolation.

A particle filter is further provided which is suitable for use with the method.

In a preferred embodiment of the invention, the particle filter has an uneven distribution of ash former on its end face—so-called variation in ash load over the inlet cross section. The particle filter is preferably charged with less ash in a peripheral region of the end face of the particle filter than in other regions of the end face. Within the meaning of the invention, a peripheral region is understood to mean a region which covers 20% or less of the end face. The ash load preferably increases in a radial direction from the outside inward on the end face of the particle filter. More preferably, the ash load increases in a radial direction from the inside outward on the end face of the particle filter. A distribution of the ash load can preferably be determined empirically by means of simulation or by means of a comparative calculation. In particular, the variation in the ash load over the inlet cross section, so on the end face of the particle filter, is selected in such a manner that a greater filtering effect results following the introduction of the ash former into the particle filter than with a uniform distribution of the ash former.

The invention is explained in greater detail with the help of a preferred exemplary embodiment and also with reference to the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
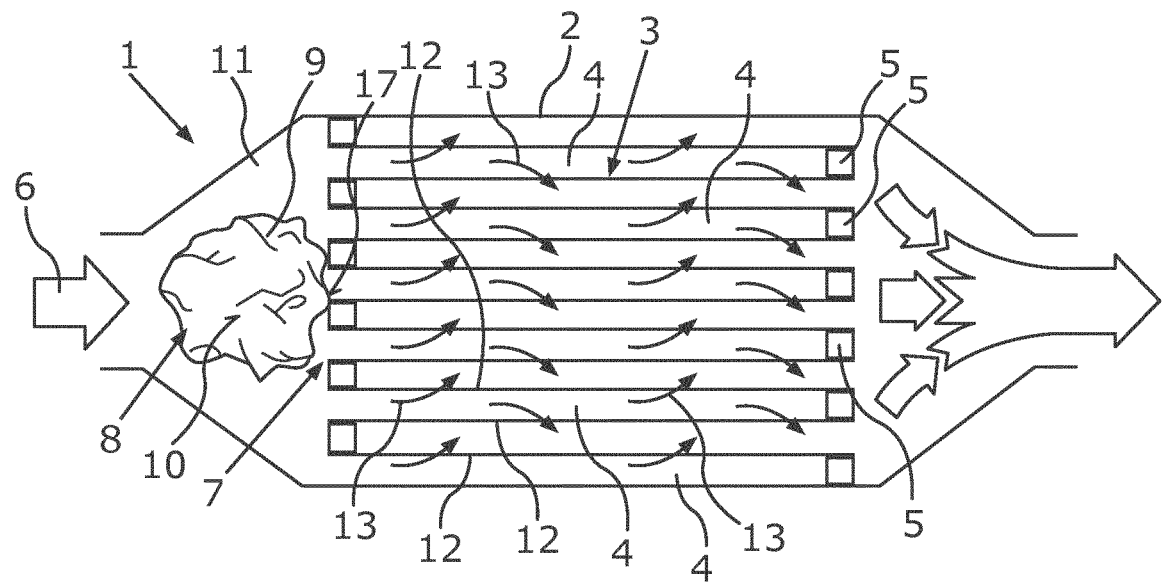
FIG. 1 shows as a schematic sectional view a particle filter of a vehicle which has a filter body, wherein an ash former is arranged on an input side of the end face of the filter body.

FIG. 1 shows a particle filter 1 in a schematic sectional view. The particle filter 1 comprises a housing 2 in which a filter body 3 is arranged. The filter body 3 has a plurality of channels 4 which have exhaust gas flowing through them during operation and in the present case are closed at the end by schematically depicted plugs 5. A flow direction of the exhaust gas through the particle filter 1 is depicted by an arrow 6 in FIG. 1. An ash former 8 which is only schematically depicted is arranged in the present case at an input side of the end face 7 of the filter body 3 viewed in this flow direction. Ash is produced by burning off the ash former 8. This ash is then introduced into the filter body 3 with the exhaust gas.

The ash former 8 may be formed by a ball or a plurality of balls made of metal paper, for example. Accordingly, the ash former 8 comprises a carrier material 9 on which at least one non-combustible constituent 10 of the ash former 8 is arranged. In the case of metal paper, the carrier material 9 may be a paper. The non-combustible constituent 10 is then supplied by a metal layer arranged on the paper. When the carrier material 9 is combusted, ash is formed and this ash is introduced into the filter body 3 of the particle filter 1.

The ash former 8 can very easily be arranged in an inlet region 11 of the housing 2 in which the housing 2 is extended to the filter body 3 in a funnel shape. For example, the ash former may be introduced into the inlet region 11, particularly crammed into the inlet region 11, via an access opening on the front side of the particle filter 1, in the form of metal paper. Even if a plurality of balls of this kind are arranged in the inlet region 11, so on the input side of the end face 7 of the filter body 3, the filter body 3 can consequently be effectively flowed through by exhaust gas.

At least one adhesive means 17 can be applied to the ash former 8, which ensures adhesion of the ash former 8 to the end face 7 of the filter body 3. This particularly applies when the ash former 8—contrary to what is schematically shown in FIG. 1—is substantially planar in design and bears against the end face 7 in a substantially planar manner.

Combustible constituents of a sludge containing metals and/or oxides, in particular metal oxides, may also be used as the carrier material 9. A metal sludge of this kind can also be applied with very little effort to the end face 7 of the filter body 3. A metal suspension may also be applied to a carrier body or the carrier material 9 made of paper and/or plastic and then the ash former 8 supplied in this way can be arranged in the inlet region 11. In terms of non-combustible constituents 10, the ash former 8 may in particular contain zinc and/or magnesium and/or aluminum and/or oxides of these metals.

In the present case it is ensured that the ash produced or created through combustion of the ash former 8 is predominantly deposited on walls 12 which delimit the channels 4 on the periphery. This can be achieved in that through a corresponding operation of an internal combustion engine 14 which is arranged upstream of the particle filter 1 (cf. FIG. 2), a suitable temperature and a suitable mass flow of the exhaust gas are set in the particle filter 1. The particles contained in the exhaust gas are retained during the through-passage through the walls 12. The through-passage of the exhaust gas through the walls 12 is illustrated in FIG. 1 by corresponding arrows 13.

The creation or production of ash from the ash former 8 is preferably carried out during a first run of the internal combustion engine 14 in the present case. The internal combustion engine 14 is arranged in a vehicle 15 which is fitted with the particle filter 1 and which is likewise depicted in highly schematic form in FIG. 2. An exhaust gas line 16 via which the exhaust gas produced by the internal combustion engine 14 is fed to the particle filter 1 is likewise shown in FIG. 2.

Through a corresponding operation of the internal combustion engine 14, it is preferably ensured during the course of production of the vehicle 15 that suitable conditions for combustion of the carrier material 9 exist in the inlet region 11. For example, during production of the vehicle 15 the internal combustion engine 14 can be operated accordingly during an end-of-line test. Through this first running of the internal combustion engine 14 or of the motor, preliminary ash creation is therefore guaranteed, during which the carrier material 9 of the ash former 8 arranged on the end face 7 is combusted and the ash is introduced into the filter body 3.

The ash former 8 may also be applied to the end face 7 of the filter body 3 in the manner of a layer substantially covering the end face 7. A layer of this kind may, in particular, exhibit perforations, so that passages are provided for the exhaust gas.

Figure 2:
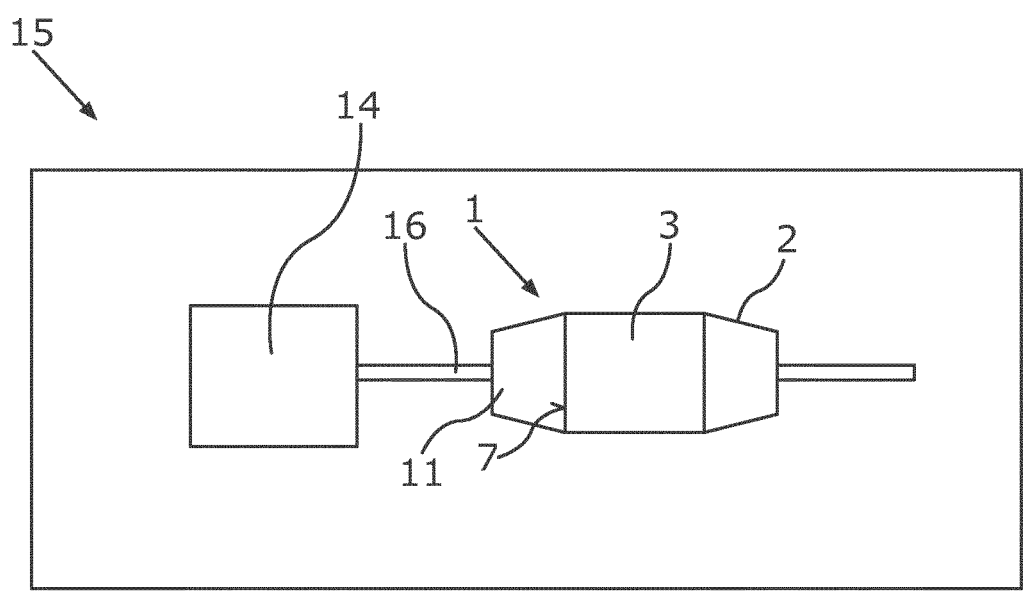
FIG. 2 shows a motor vehicle with an internal combustion engine in schematic form, wherein the particle filter according to FIG. 1 is arranged in an exhaust gas line of the internal combustion engine.
Figure 3:
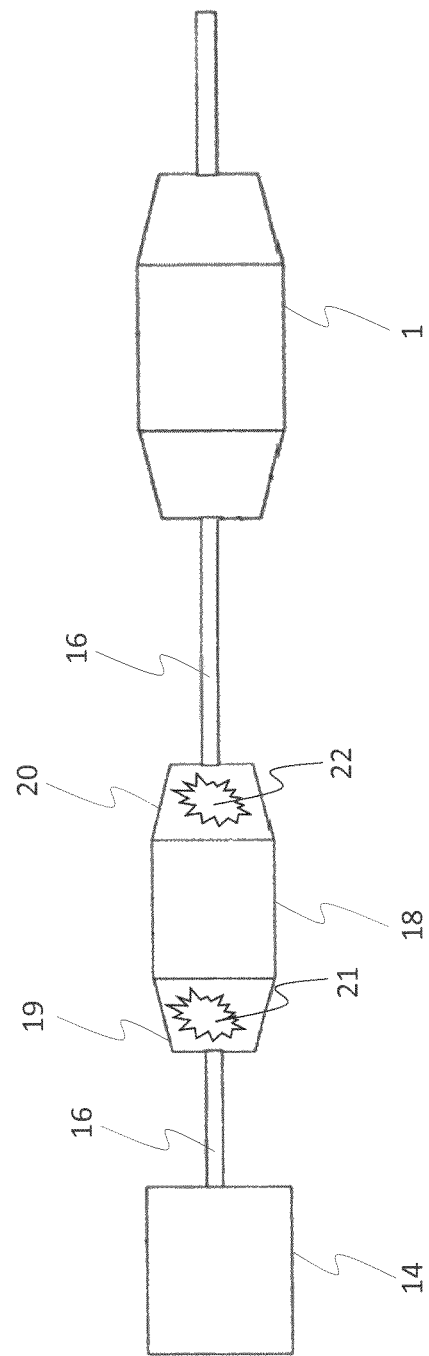
FIG. 3 shows an internal combustion engine in schematic form, wherein the particle filter according to FIG. 1 and a catalytic converter are arranged in an exhaust gas line of the internal combustion engine.

In FIG. 3 the internal combustion engine 14 is arranged in a vehicle (not shown) which is fitted with the particle filter 1, as is depicted in FIGS. 1 and 2. An exhaust gas line 16, via which the exhaust gas produced by the internal combustion engine 14 is supplied to the particle filter 1, is likewise shown in FIG. 3.

Through corresponding operation of the internal combustion engine 14, it is preferably ensured as part of the production of the vehicle (not shown) that suitable conditions exist for combustion of the carrier material and, as previously represented, ash is formed or released.

In this case, the carrier material with the ash former is arranged upstream of the particle filter 1 at the other introduction sites 21, 22, so in the inlet funnel 19 and in the outlet funnel 20 of the catalytic converter 18. Through the first run of the internal combustion engine 14 or of the motor, preliminary ash creation is therefore guaranteed, during which the ash is introduced into the particle filter 1.

LIST OF REFERENCE CHARACTERS

1 Particle filter
2 Housing
3 Filter body
4 Channel
5 Plug
6 Arrow
7 End face
8 Ash former
9 Carrier material
10 Constituent
11 Inlet region
12 Wall
13 Arrow
14 Internal combustion engine
15 Vehicle
16 Exhaust gas line
17 Adhesive
18 Catalytic converter 19 Inlet funnel
20 Outlet funnel
21, 22 Further introduction site The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a particle filter of a vehicle, comprising the acts of:
    inserting an ash former through an access opening on a front side of the particle filter and disposing the ash former in a funnel shaped inlet region of a housing of the particle filter, wherein the ash former is a ball with a carrier material and a non-combustible constituent arranged on the carrier material;
    creating an ash to be introduced into a filter body of the particle filter by combusting the carrier material; and
    introducing the ash into the filter body of the particle filter.

2. The method according to claim 1, wherein the ash is additionally created by soot from the combusting of the carrier material and wherein the carrier material is an organic carrier material.

3. The method according to claim 1, wherein a paper and/or a plastic and/or an organic material of a suspension is used as the carrier material.

4. The method according to claim 1, wherein the non-combustible constituent is a metal layer applied to the carrier material.

5. The method according to claim 1, wherein during a manufacture of the vehicle fitted with the particle filter, an internal combustion engine of the vehicle is operated in such a manner that conditions for the combusting of the carrier material are present in a region of the ash former.

6. The method according to claim 1, wherein a temperature and/or a mass flow of the exhaust gas flowing through the particle filter of an internal combustion engine of the vehicle fitted with the particle filter are set in such a manner that the ash is deposited at least predominantly on a wall of the filter body.

7. The method according to claim 1, wherein the particle filter is used for filtering particles from the exhaust gas of an internal combustion engine operated as a gasoline engine of the vehicle.

* * * * *